(12) United States Patent
Lun et al.

(10) Patent No.: US 6,786,311 B2
(45) Date of Patent: Sep. 7, 2004

(54) MAGNETORHEOLOGICAL PISTON AND DAMPER

(75) Inventors: Saiman Lun, Centerville, OH (US); Randall L. Hofmann, Dayton, OH (US); Ilya Lisenker, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/421,088

(22) Filed: Apr. 23, 2003

(65) Prior Publication Data

US 2003/0192752 A1 Oct. 16, 2003

Related U.S. Application Data

(63) Continuation of application No. 10/034,202, filed on Dec. 27, 2001, now Pat. No. 6,612,409.

(51) Int. Cl.$^7$ .................................................. F16F 9/63
(52) U.S. Cl. ..................................................... 188/267.2
(58) Field of Search .............................. 188/267, 267.1, 188/267.2

(56) References Cited

U.S. PATENT DOCUMENTS

| 5,018,606 | A | 5/1991 | Carlson .................. 188/267.1 |
| 5,333,708 | A | 8/1994 | Jensen et al. .......... 188/322.14 |
| 5,510,988 | A | 4/1996 | Majeed et al. |
| 5,652,704 | A | 7/1997 | Catanzarite |
| 6,086,385 | A | 7/2000 | Wang et al. |
| 6,095,486 | A | 8/2000 | Ivers et al. .................. 188/267 |
| 6,142,813 | A | 11/2000 | Cummings et al. |
| 6,151,930 | A | 11/2000 | Carlson ...................... 68/12.06 |
| 6,158,470 | A | 12/2000 | Ivers et al. .................. 137/807 |
| 6,161,662 | A | 12/2000 | Johnston et al. |
| 6,162,085 | A | 12/2000 | Chugh et al. |
| 6,171,146 | B1 | 1/2001 | Fink et al. |
| 6,179,658 | B1 | 1/2001 | Gunay et al. |
| 6,203,364 | B1 | 3/2001 | Chupak et al. |
| 6,208,233 | B1 | 3/2001 | Stein, Sr. et al. |
| 6,247,951 | B1 | 6/2001 | Di Liello et al. |
| 6,247,965 | B1 | 6/2001 | Cummings et al. |
| 6,279,702 | B1 | 8/2001 | Koh ......................... 188/267.2 |
| 6,305,957 | B1 | 10/2001 | Fink et al. |
| 6,318,519 | B1 | 11/2001 | Kruckemeyer et al. ...... 188/267 |
| 6,318,520 | B1 | 11/2001 | Lisenker et al. ............. 188/267 |
| 6,338,651 | B1 | 1/2002 | Svette, Jr. et al. |
| 6,345,706 | B1 | 2/2002 | Oliver et al. |
| 6,406,307 | B2 | 6/2002 | Bungo et al. |
| 6,443,137 | B1 | 9/2002 | Kraft et al. |
| 6,454,060 | B1 | 9/2002 | Lisenker et al. |
| 6,494,751 | B1 | 12/2002 | Morello et al. |
| 6,508,666 | B1 | 1/2003 | Francis |
| 6,533,588 | B1 | 3/2003 | Woith et al. |
| 6,533,611 | B2 | 3/2003 | Morello et al. |
| 6,535,396 | B1 | 3/2003 | Degenkolb et al. |
| 6,556,118 | B1 | 4/2003 | Skinner |
| 6,565,372 | B2 | 5/2003 | Bakker et al. |
| 6,578,444 | B1 | 6/2003 | Wendelin |
| 2003/0029683 | A1 * | 2/2003 | Oliver et al. ............. 188/267.2 |
| 2003/0106752 | A1 * | 6/2003 | Oliver et al. ............. 188/267.2 |

FOREIGN PATENT DOCUMENTS

DE        WO 99/58873        11/1999

OTHER PUBLICATIONS

U.S. patent application Ser. No. 09/823,267 filed Mar. 20, 2001, Magnetorheological Damper with Piston Bypass.

* cited by examiner

Primary Examiner—Thomas Williams
(74) Attorney, Agent, or Firm—Michael D. Smith

(57) ABSTRACT

A magnetorheological piston includes a body having a substantially magnetically energizable passageway and a substantially magnetically non-energizable passageway. The substantially magnetically non-energizable passageway has a valveless passageway throat and has a flow cross-sectional area which has a minimum at the passageway throat and which is larger away from the passageway throat. A magnetorheological damper includes a cylinder and the above-described magnetorheological piston, wherein the piston is positioned in, and slideably engages, the cylinder.

4 Claims, 3 Drawing Sheets

MAGNETORHEOLOGICAL PISTON AND DAMPER

CROSS REFERENCE TO RELATED APPLICATIONS

The present application is a continuation application of U.S. application Ser. No. 10/034,202 filed Dec. 27, 2001 now U.S. Pat. No. 6,612,409.

TECHNICAL FIELD

The present invention relates generally to piston dampers, and more particularly to a magnetorheological (MR) piston and damper.

BACKGROUND OF THE INVENTION

Conventional piston dampers include MR dampers having a cylinder containing an MR fluid and having an MR piston which slideably engages the cylinder. The MR fluid passes through an orifice of the MR piston. Exposing the MR fluid in the orifice to a varying magnetic field, generated by providing a varying electric current to an electric coil of the MR piston, varies the damping effect of the MR fluid in the orifice providing variably-controlled damping of relative motion between the MR piston and the cylinder. The electric current is varied to accommodate varying operating conditions, as is known to those skilled in the art. A rod has a first end attached to the MR piston and a second end extending outside the cylinder. The cylinder and the rod are attached to separate structures to dampen relative motion of the two structures along the direction of piston travel.

A known design includes an MR piston having a substantially annular, magnetically energizable passageway and a magnetically non-energizable passageway positioned radially inward from the magnetically energizable passageway. The magnetically non-energizable passageway includes a check valve which is in either a valve closed position or a valve open position. The check valve blocks flow in one direction (usually when the rod moves more outward from the cylinder). The check valve allows flow in the other direction (usually when the rod moves more inward into the cylinder). The flow cross-sectional area of the magnetically non-energizable passageway is chosen for a particular damper application.

What is needed is an improved magnetorheological piston and an improved magnetorheological damper.

SUMMARY OF THE INVENTION

In a first expression of an embodiment of the invention, a magnetorheological piston includes a magnetorheological piston body having a substantially magnetically energizable passageway and having a substantially magnetically non-energizable passageway spaced apart from the magnetically energizable passageway. The substantially magnetically non-energizable passageway has a valveless passageway throat and has a flow cross-sectional area which has a minimum at the passageway throat and which is larger away from the passageway throat.

An alternate first expression is for a magnetorheological damper including a cylinder and the magnetorheological piston of the previously-described first expression. The magnetorheological piston is positioned within, and slideably engages, the cylinder.

In a second expression of an embodiment of the invention, a magnetorheological piston includes a magnetorheological piston body having a longitudinal axis, having a substantially magnetically energizable passageway substantially coaxially aligned with the longitudinal axis, and having a substantially magnetically non-energizable passageway spaced apart radially inward from the substantially magnetically energizable passageway. The substantially magnetically non-energizable passageway has a valveless passageway throat and has a flow cross-sectional area which has a minimum at the passageway throat and which is larger away from the passageway throat.

In a third expression of an embodiment of the invention, a magnetorheological piston includes a magnetorheological piston body having a longitudinal axis, having a core with an electrical coil, having a longitudinal end plate attached to the core, having a substantially magnetically energizable passageway substantially coaxially aligned with the longitudinal axis, and having a substantially magnetically non-energizable passageway spaced apart radially inward from the substantially magnetically energizable passageway. The substantially magnetically non-energizable passageway has a core portion and a longitudinal end plate portion. The substantially magnetically non-energizable passageway has a valveless passageway throat and has a flow cross-sectional area which has a minimum at the passageway throat and which is larger away from the passageway throat.

An alternate third expression is for a magnetorheological damper including a cylinder and the magnetorheological piston of the previously-described third expression. The magnetorheological piston is positioned within, and slideably engages, the cylinder.

Several benefits and advantages are derived from one or more of the expressions of a first embodiment of the invention. Having the substantially magnetically non-energizable passageway with a smaller flow cross-sectional area at a passageway throat and with a larger flow cross-sectional area away from the passageway throat limits the length of flow restriction to the length of a short passageway throat which prevents unwanted damper performance characteristics at low temperature (due to the high viscosity of low-temperature MR fluid), as can be appreciated by those skilled in the art. Locating the substantially magnetically non-energizable passageway (also known as the by-pass) radially inward from the substantially magnetically energizable passageway reduces the unwanted MR effect of valving the MR fluid flow in the substantially magnetically non-energizable passageway. Having the magnetorheological piston body include a core with an electrical coil and include a longitudinal end plate attached to the core, wherein the substantially magnetically non-energizable passageway includes a core portion and a longitudinal end plate portion, allows the passageway throat to be created by a monolithic portion of the longitudinal end plate, an orifice plug positioned inside this passageway in the longitudinal end plate, an orifice tube positioned inside this passageway in the core, or an orifice disc positioned inside this passageway longitudinally between the core and the longitudinal end plate. An MR piston having a tunable substantially magnetically non-energizable passageway is obtained by choosing an appropriate longitudinal end plate, orifice plug, orifice tube, or orifice disc having a desired orifice for a particular MR damper application.

DESCRIPTION OF THE PREFERRED EMBODIMENT

Figure 1:
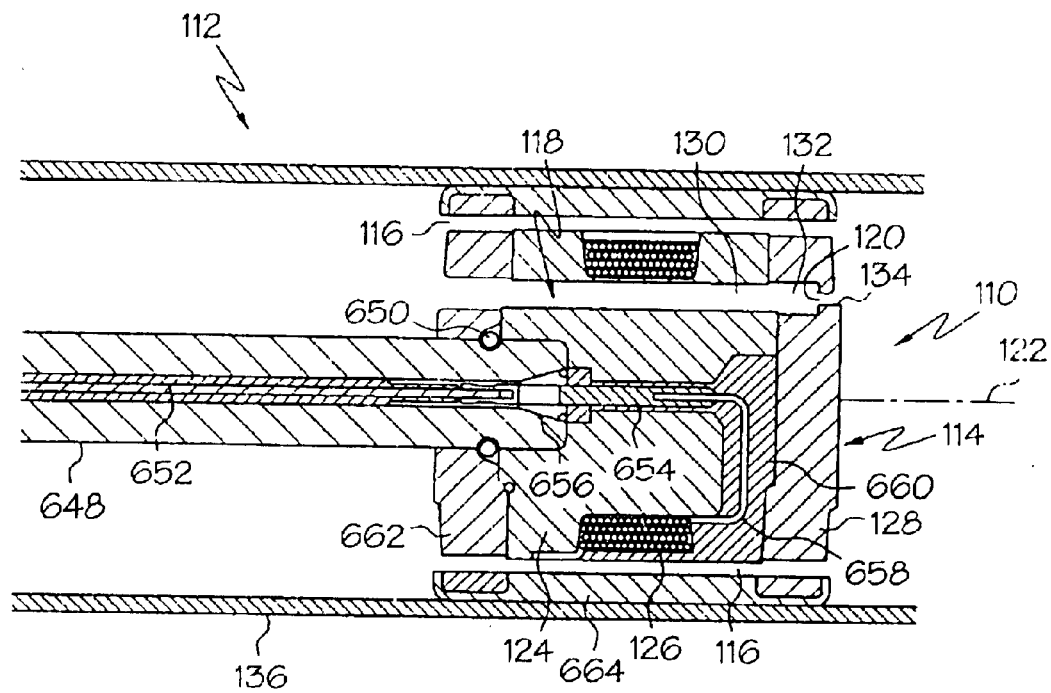
FIG. 1 is a longitudinal cross-sectional view of a portion of a first embodiment of a magnetorheological piston and damper of the invention including a magnetorheological piston body having a longitudinal end plate with a monolithic portion bounding the passageway throat of the substantially magnetically non-energizable passageway.

Referring now to the drawings, wherein like numerals represent like elements throughout, FIG. 1 shows a first embodiment of the present invention. A first expression of the first embodiment is for a magnetorheological piston 110 which is also known as a magnetorheological damper piston. An alternate first expression of the first embodiment is for a magnetorheological damper 112 which includes the magnetorheological piston 110. An application of the magnetorheological damper 112 is its use as a shock absorber for an automobile, an airplane, or other type of vehicle. Another application is use of the magnetorheological damper 112 to provide motion resistance on exercise equipment such as stair climbers and rowing machines. A further application is use of the magnetorheological damper 112 to provide motion isolation for a building, bridge, or other structure subject to earthquakes. An additional application is use of the magnetorheological damper 112 to dampen vibrations encountered by vehicles and structures in outer space. Other applications are left to the artisan.

In a first expression of the first embodiment of the invention shown in FIG. 1, the magnetorheological piston 110 includes a magnetorheological piston body 114 having a substantially magnetically energizable passageway 116 and having a substantially magnetically non-energizable passageway 118 (also known as a by-pass) spaced apart from the substantially magnetically energizable passageway 116. The term "passageway" means a through passageway. The substantially magnetically non-energizable passageway 118 has a valveless passageway throat 120 and has a flow cross-sectional area which has a minimum at the passageway throat 120 and which is larger away from the passageway throat 120.

In a first example of the first expression, the magnetorheological piston body 114 has a longitudinal axis 122, the substantially magnetically energizable passageway 116 is substantially coaxially aligned with the longitudinal axis 122, and the substantially magnetically non-energizable passageway 118 is disposed radially inward from the substantially magnetically energizable passageway 116. In one construction, the substantially magnetically energizable passageway 116 is a substantially annularly cylindrical passageway having a flow cross-sectional shape of segments of a substantially circular ring. In the same or a different construction, the substantially magnetically non-energizable passageway 118 is a cylindrical passageway having a flow cross-sectional shape of a circle apart from the passageway throat 120. In the same or a different construction, the passageway throat 120 has a flow cross-sectional shape of a circle, a radially-aligned ellipse, or a circumferential arc segment. Other shapes are left to the artisan.

In the same or a different example of the first expression, the substantially magnetically non-energizable passageway 118 has a passageway length, and the passageway throat 120 has a throat length. The passageway length includes the throat length. The flow cross-sectional area of the passageway throat 120 is substantially constant along the throat length. The flow cross-sectional area of the substantially magnetically non-energizable passageway 118 apart from the passageway throat 120 is substantially constant along the passageway length.

In the same or a further example of the first expression, the magnetorheological piston body 114 has a core 124 with an electrical coil 126 and has a longitudinal end plate 128 attached to the core 124. The substantially magnetically non-energizable passageway 118 has a core portion 130 and a longitudinal end plate portion 132. The core portion 130 is that portion of the substantially magnetically non-energizable passageway 118 located in the core 124, and the longitudinal end plate portion 132 is that portion of the substantially magnetically non-energizable passageway 118 located in the longitudinal end plate 128. The longitudinal lengths of the core 124 and the longitudinal end plate 128 are left to the artisan.

In one design of the first expression, the magnetorheological piston body 114 includes a monolithic portion 134 bounding the passageway throat 120. In one modification, the substantially magnetically non-energizable passageway 118 has two longitudinal ends, and the monolithic portion 134 is disposed substantially at one of the longitudinal ends. In one variation, in the example including the longitudinal end plate 128, the longitudinal end plate 128 includes the monolithic portion 134. In one design, the longitudinal length of the monolithic portion 134 is less than one-tenth of the passageway length.

In an alternate first expression of the first embodiment of the invention shown in FIG. 1, the magnetorheological damper 112 includes a cylinder 136 and includes the magnetorheological piston 110 described in the fifth previous paragraph. The magnetorheological piston 110 is disposed within, and slideably engages, the cylinder 136. The previously described examples, constructions, designs, and variations of the magnetorheological piston 110 of the first expression are equally applicable to the magnetorheological damper 112 of the alternate first expression.

Figure 2:
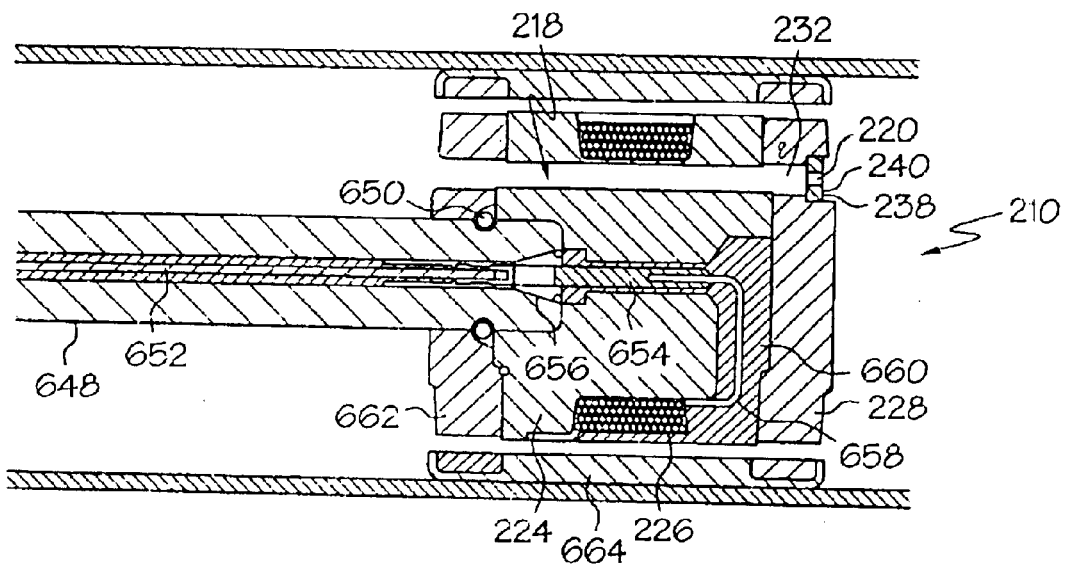
FIG. 2 is a longitudinal cross-sectional view of a portion of a second embodiment of a magnetorheological piston and damper of the invention including a magnetorheological piston body having a longitudinal end plate and including an orifice plug.

In a second embodiment of the invention shown in FIG. 2, the magnetorheological piston 210 also includes an orifice member 238 disposed inside the substantially magnetically non-energizable passageway 218 and bounding the passageway throat 220. The orifice member 238 is a member having an orifice which defines the passageway throat 220. In one modification, the substantially magnetically non-energizable passageway 218 has two longitudinal ends, and the orifice member 238 is disposed substantially at one of the longitudinal ends. In one variation, in the example including the longitudinal end plate 228, the orifice member 238 is an orifice plug 240 disposed inside the longitudinal end plate portion 232 of the substantially magnetically non-energizable passageway 218. In one design, the length of the orifice member 238 or the orifice plug 240 is less than half of the passageway length. In another design, the length of the orifice member 238 or the orifice plug 240 is less than one-tenth of the passageway length.

Figure 3:
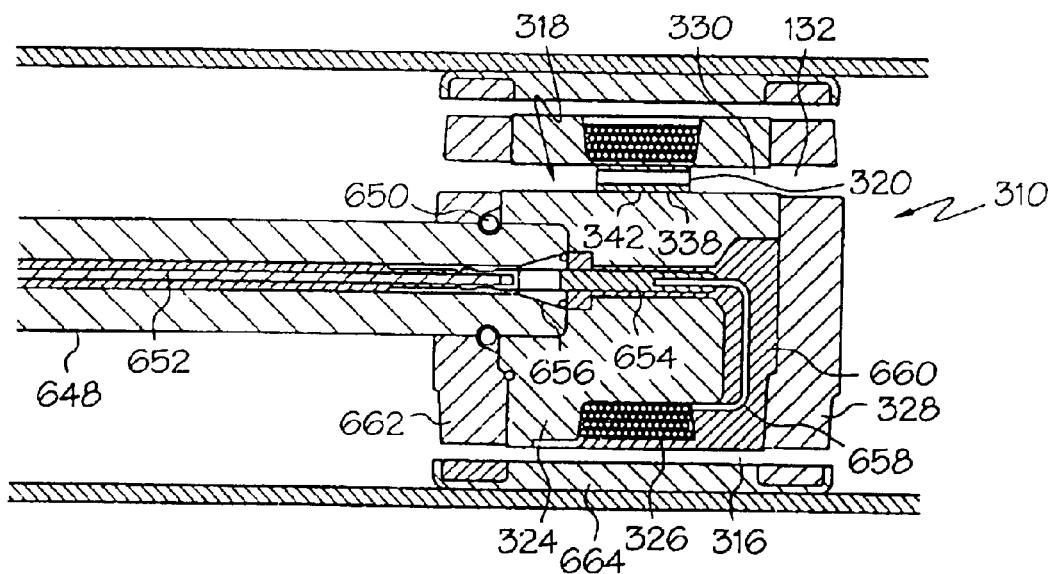
FIG. 3 is a longitudinal cross-sectional view of a portion of a third embodiment of a magnetorheological piston and damper of the invention including a magnetorheological piston body having a core with an electrical coil and including an orifice tube.

In a third embodiment of the invention shown in FIG. 3, the magnetorheological piston 310 also includes an orifice member 338 disposed inside the substantially magnetically non-energizable passageway 318 and bounding the passageway throat 320, wherein the substantially magnetically non-energizable passageway 318 has two longitudinal ends, and wherein the orifice member 338 is disposed between the longitudinal ends. In one variation, in the example including the core 324, the orifice member 338 is an orifice tube 342 disposed inside the core portion 330 of the substantially magnetically non-energizable passageway 318. In one construction, the orifice tube 342 comprises (consists essentially of, or consists of) a magnetizable material. In this construction, the orifice tube 342 becomes part of the magnetic circuit improving damping force capability in the substantially magnetically energizable passageway 316. The longitudinal placement of the orifice tube 342 relative to the electrical coil 326 is left to the artisan. In another construction, the orifice tube 342 comprises (consists essentially of, or consists of) a non-magnetizable material. In one design, the length of the orifice member 338 or the orifice tube 342 is less than one-third of the passageway length.

Figure 4:
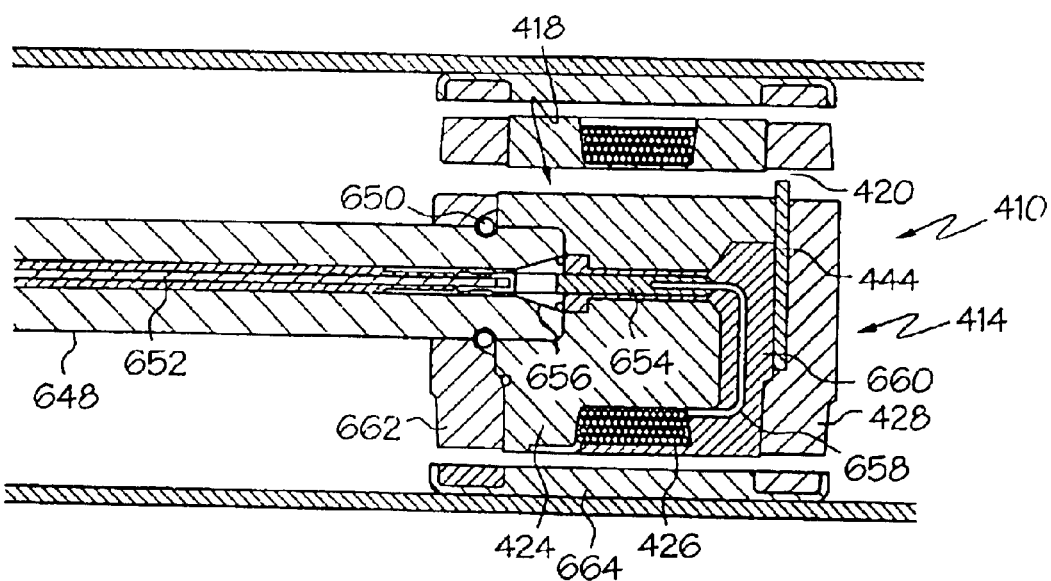
FIG. 4 is a longitudinal cross-sectional view of a portion of a fourth embodiment of a magnetorheological piston and damper of the invention including an orifice disc positioned between the core and the longitudinal end plate of the magnetorheological piston body.
Figure 5:
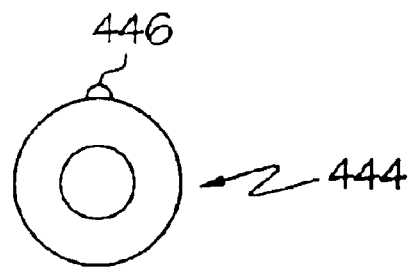
FIG. 5 is a front view of the orifice disc of FIG. 4.
Figure 6:
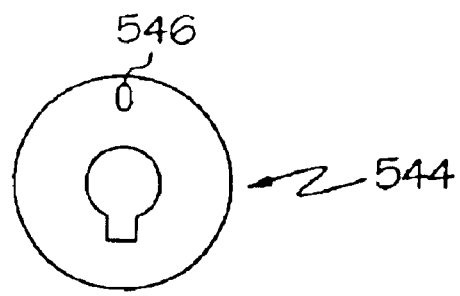
FIG. 6 is a front view of a first alternate embodiment of the orifice disc of FIG. 4.
Figure 7:
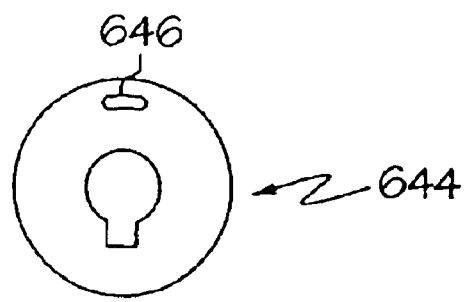
FIG. 7 is a front view of a second alternate embodiment of the orifice disc of FIG. 4.

In a fourth embodiment of the invention shown in FIG. 4, the magnetorheological piston 410 also includes an orifice disc 444 disposed between the core 424 and the longitudinal end plate 428 of the magnetorheological piston body 414 and bounding the passageway throat 420. In one variation, the passageway throat 420 is radially inwardly bounded by the orifice disc 444. In this variation, longitudinal flow occurs radially beyond the circumference of the orifice disc 444. An alignment tab 446 is shown on the orifice disc 444 in FIG. 5. A first alternate embodiment of the orifice disc 544 is shown in FIG. 6, wherein orifice disc 544 has a slot 546 bounding the passageway throat. In this orifice disc 544, longitudinal flow occurs through the slot 546. In one design, the slot 546 is a radially-elongated slot. A second alternate embodiment of the orifice disc 644 is shown in FIG. 6, wherein the orifice disc 644 has a slot 646 which is a circumferentially-elongated slot which improves flow alignment through the substantially magnetically non-energizable passageway 418.

In one construction applicable to all of the embodiments of the magnetorheological piston 110, 210, 310, and 410, a rod 648 is connected to the piston by a retention ring 650. An electrode 652 within the rod 648 is connected to a connector 654 (and protected by a seal 656) which is connected to an end of a wire 658 (which passes through a conduit of an electrical insulator 660 (such as a plastic insulator) whose windings create the electrical coil 126, 226, 326, and 426. Another longitudinal end plate 662 of the magnetorheological piston body is attached to the core 124, 224, 324, and 424 as shown in FIGS. 1–4. A piston ring 664 of the magnetorheological piston body is crimped over the longitudinal end plates 662, 128, 228, 328, and 428. Other constructions are left to the artisan. It is noted that MR fluid has been omitted from the figures for clarity. In one construction, the orifice member 238 and 338 is secured by being press-fit, staked, or riveted. In the same or another construction, the substantially magnetically non-energizable passageway 118, 218, 318, and 418 is a valveless passageway.

Several benefits and advantages are derived from one or more of the expressions of a first embodiment of the invention. Having the substantially magnetically non-energizable passageway with a smaller flow cross-sectional area at a passageway throat and with a larger flow cross-sectional area away from the passageway throat limits the length of flow restriction to the length of a short passageway throat which prevents unwanted damper performance characteristics at low temperature (due to the high viscosity of low-temperature MR fluid), as can be appreciated by those skilled in the art. Locating the substantially magnetically non-energizable passageway (also known as the by-pass) radially inward from the substantially magnetically energizable passageway reduces the unwanted MR effect of valving the MR fluid flow in the substantially magnetically non-energizable passageway. Having the magnetorheological piston body include a core with an electrical coil and include a longitudinal end plate attached to the core, wherein the substantially magnetically non-energizable passageway includes a core portion and a longitudinal end plate portion, allows the passageway throat to be created by a monolithic portion of the longitudinal end plate, an orifice plug positioned inside this passageway in the longitudinal end plate, an orifice tube positioned inside this passageway in the core, or an orifice disc positioned inside this passageway longitudinally between the core and the longitudinal end plate. An MR piston having a tunable substantially magnetically non-energizable passageway is obtained by choosing an appropriate longitudinal end plate, orifice plug, orifice tube, or orifice disc having a desired orifice for a particular MR damper application.

The foregoing description of several expressions and embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A magnetorheological piston comprising a magnetorheological piston body having an electric coil, having a substantially magnetically energizable magnetorheological-fluid passageway adapted to be substantially magnetically energized by the electric coil and having a substantially magnetically non-energizable magnetorheological-fluid passageway spaced apart from the substantially magnetically energizable magnetorheological-fluid passageway, wherein the substantially magnetically non-energizable magnetorheological-fluid passageway has a valveless passageway throat and has a flow cross-sectional area which has a minimum at the passageway throat and which is larger away from the passageway throat, wherein the substantially magnetically non-energizable magnetorheological-fluid passageway is a valveless passageway, and wherein the substantially magnetically non-energizable magnetorheological-fluid passageway is bound on all sides by the magnetorheological piston body.

2. A magnetorheological piston comprising a magnetorheological piston body having an electric coil, having a substantially magnetically energizable magnetorheological-fluid passageway adapted to be substantially magnetically energized by the electric coil and having a substantially magnetically non-energizable magnetorheological-fluid passageway spaced apart from the substantially magnetically energizable magnetorheological-fluid passageway, wherein the substantially magnetically non-energizable magnetorheological-fluid passageway has a valveless passageway throat and has a flow cross-sectional area which has a minimum at the passageway throat and which is larger away from the passageway throat, wherein the substantially magnetically non-energizable magnetorheological-fluid passageway is a valveless passageway, wherein the magnetorheological piston body has a longitudinal axis, wherein the substantially magnetically energizable magnetorheological-fluid passageway is substantially coaxially aligned with the longitudinal axis, and wherein the substantially magnetically non-energizable magnetorheological-fluid passageway is disposed radially inward from the substantially magnetically energizable magnetorheological-fluid passageway.

3. The magnetorheological piston of claim 2, wherein the substantially magnetically non-energizable magnetorheological-fluid passageway has a passageway length and the passageway throat has a throat length, wherein the flow cross-sectional area of the passageway throat is substantially constant along the throat length, and wherein the flow cross-sectional area of the substantially magnetically non-energizable magnetorheological-fluid passageway apart from the passageway throat is substantially constant along the passageway length.

4. A magnetorheological damper comprising a cylinder and a magnetorheological piston disposed within, and slideably engaging, the cylinder, wherein the magnetorheological piston includes a magnetorheological piston body having an electric coil, having a substantially magnetically energizable magnetorheological-fluid passageway adapted to be substantially magnetically energized by the electric coil and having a substantially magnetically non-energizable magnetorheological-fluid passageway spaced apart from the substantially magnetically energizable magnetorheological-fluid passageway, wherein the substantially magnetically non-energizable magnetorheological-fluid passageway has a valveless passageway throat and has a flow cross-sectional area which has a minimum at the passageway throat and which is larger away from the passageway throat, wherein the substantially magnetically non-energizable magnetorheological-fluid passageway is a valveless passageway, and wherein the substantially magnetically non-energizable magnetorheological-fluid passageway is bound on all sides by the magnetorheological piston body.

* * * * *